United States Patent [19]

Geczy

[11] Patent Number: 4,511,193
[45] Date of Patent: Apr. 16, 1985

[54] THRUST AND RADIAL BEARING ASSEMBLY

[75] Inventor: Bela A. Geczy, Orange, Calif.

[73] Assignee: Smith International, Inc., Newport Beach, Calif.

[21] Appl. No.: 579,150

[22] Filed: Feb. 10, 1984

[51] Int. Cl.³ .............................................. F16C 19/18
[52] U.S. Cl. ....................................... 384/611; 384/615
[58] Field of Search ............... 308/227, 235, 230, 233, 308/236, 229

[56] References Cited

U.S. PATENT DOCUMENTS

| 3,879,094 | 4/1975 | Tschirky et al. | 308/230 |
| 3,894,818 | 7/1975 | Tschirky | 308/230 |
| 3,938,867 | 2/1976 | Johnston | 308/235 |
| 4,199,201 | 4/1980 | Trzeciak | 308/230 |

Primary Examiner—Lenard A. Footland
Attorney, Agent, or Firm—Christie, Parker & Hale

[57] ABSTRACT

A combined radial and thrust bearing assembly is set forth for a down-hole drilling assembly to journal a shaft, mounting the drill bit, in a housing. The bearing assembly is used between a down-hole fluid powered motor and a drill bit for drilling oil wells, for example. The bearing assembly includes cooperative pairs of upper and lower inner races located on the shaft for mutual rotation. Each of the inner races includes a pair of interchangeable toroidal tracks. Cooperative pairs of upper and lower outer races are fixed against rotation in the housing. Each outer race has a pair of interchangeable toroidal tracks to selectively cooperate with the tracks of the inner races to define a toroidal channel to receive a number of bearing balls. Spring means are disposed between the upper and lower pairs of outer races and the housing and between the upper and lower pairs of outer races to provide a compliant coupling for the even distribution of radial and upwardly and downwardly directed thrust loads between the races and balls and eventual transfer to the housing. Drilling fluid is circulated through the bearing assembly for cooling and lubrication.

17 Claims, 4 Drawing Figures

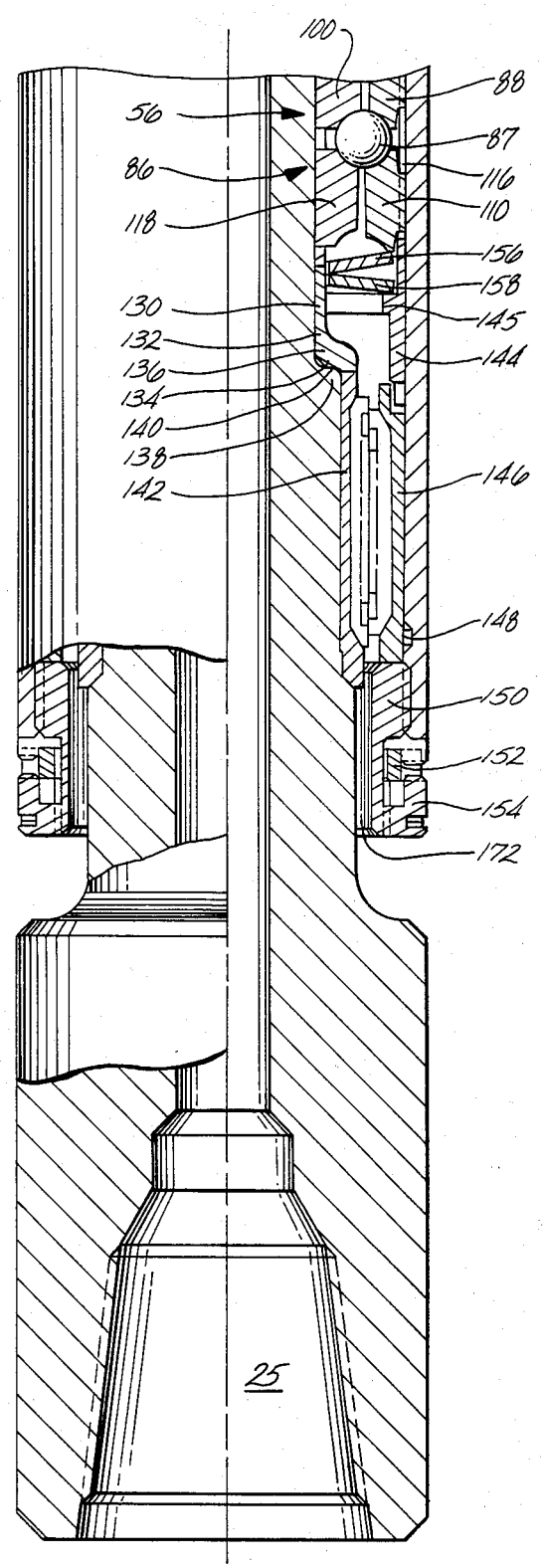

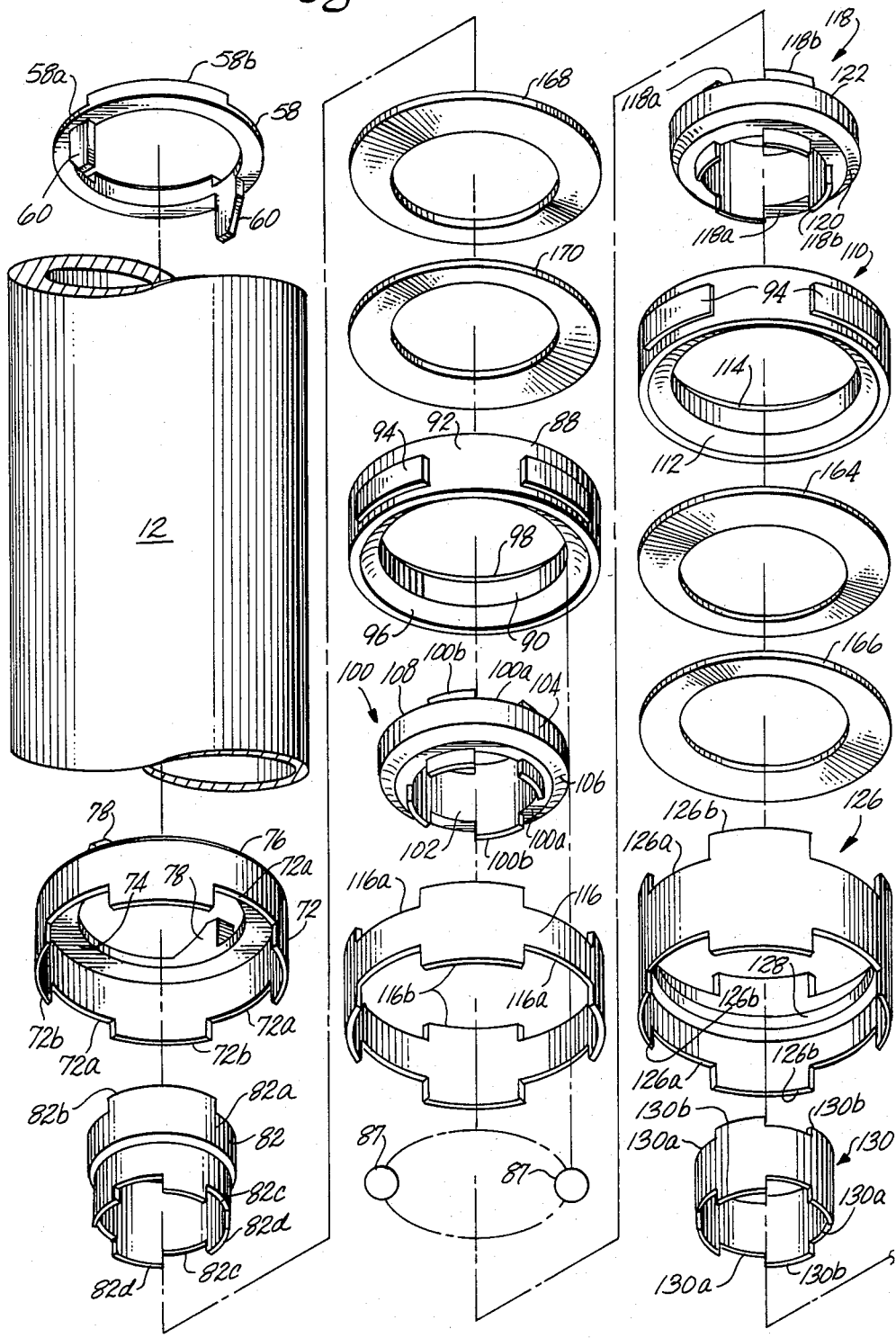

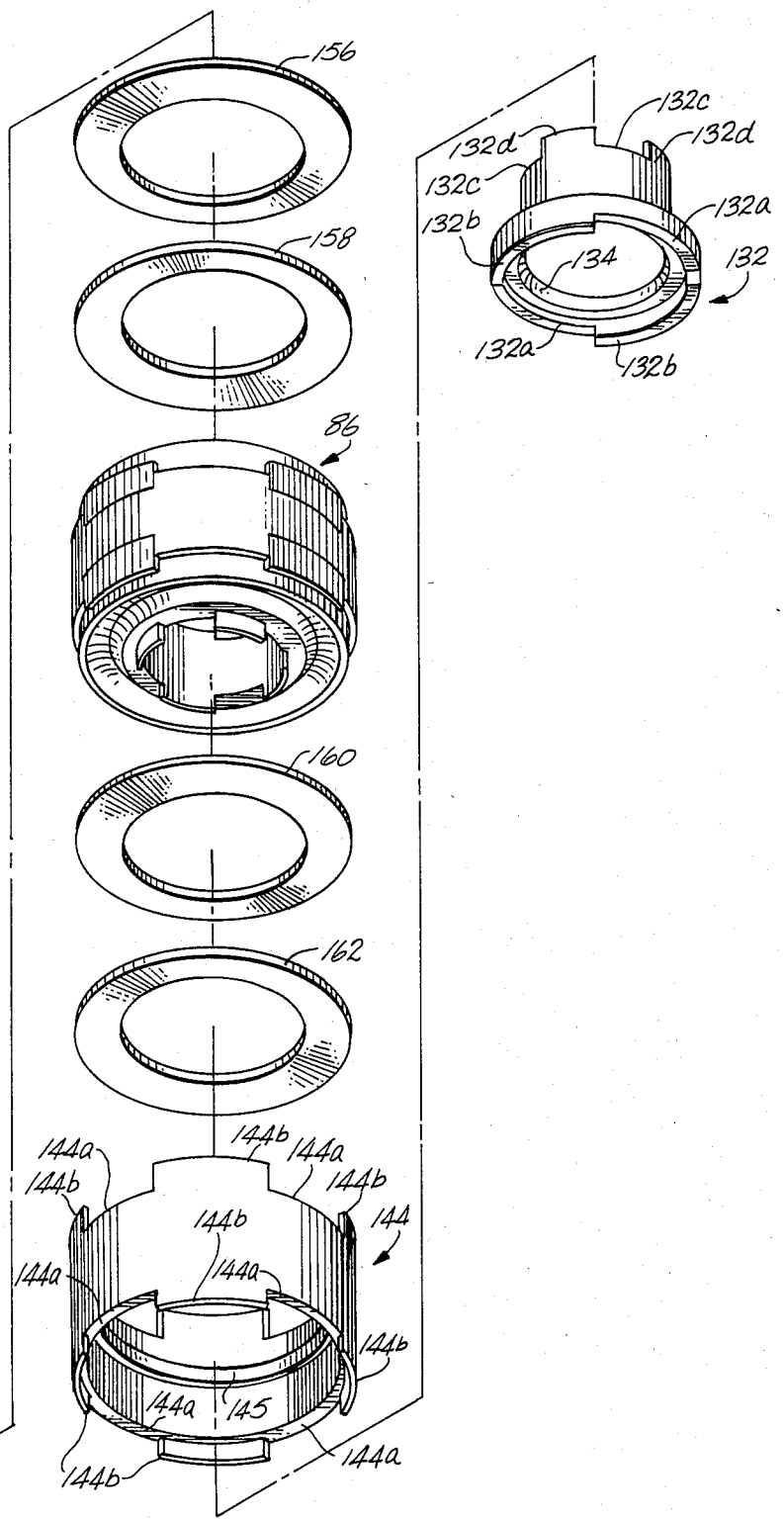

THRUST AND RADIAL BEARING ASSEMBLY

FIELD OF THE INVENTION

This invention relates to down hole drilling assemblies. More particularly, this invention relates to radial and thrust bearings for the assembly.

BACKGROUND OF THE INVENTION

In the drilling of wells for production of oil, gas, and the like, it has been known to use down hole drilling assemblies having fluid motors to rotate the drill bit rather than rotating the entire drill string. In such drilling operations, a drill string comprising lengths of pipe, extends down the well bore having the drilling assembly secured at its lower end.

The drilling assembly has a casing, usually screwed to the bottom end of the pipe string, which includes one of two types of fluid motors. One type is a multi-stage progressive-cavity positive-displacement motor and the other type of motor is a turbine. The motor has a rotor coupled to a shaft. The shaft, in turn, mounts the drill bit. The shaft is contained within a housing connected to the casing by suitable means.

Drilling fluid, in the form of a special "mud", is pumped down the drill string to the drilling assembly to drive the fluid motor. The mud is admitted to the casing and the motor which, due to the energy of the pumped mud, rotates the rotor shaft and drill bit. The mud leaving the motor is directed through the shaft to the bit and the well bore to cool the bit and remove rock fragments from the well.

To journal the shaft for rotation, the housing includes a bearing assembly. The bearing assembly must be capable of withstanding and transmitting various thrust (axial) loads as well as radial loads between the shaft to the housing. For example, to drill the well, weight is applied to the drill string and drilling assembly to force the drill bit against the rock formation. This is referred to as the "on-bottom condition", that is, when the rock bit is on the bottom of the hole. When at the on-bottom condition, the shaft imposes an up-hole thrust loading on the bearing assembly which must effectively be transferred to the housing. These on-bottom thrust loads can be many tens of thousands of pounds and must be accommodated by the bearing assembly.

When the rock bit is off the bottom of the hole, and the motor is operated, the mud pumped down the well string applies a down-hole thrust on the rotor of the motor. This down-hole thrust is transmitted to the shaft resulting in a down-hole thrust load upon the bearing assembly. The bearing assembly must transmit these off-bottom, down-hole thrust loads between the shaft and housing. Off-bottom thrust loads can be as large or larger than the on-bottom thrust loads. While total operating time for the off-bottom loading may be less than the operating time for the on-bottom loading, such time intervals can be substantial.

To drill a hole, ordinarily mud flow is commenced with the rock bit off bottom. The drill string is then lowered to bring the drill bit to an on-bottom condition in engagement with the rock formation. Drilling continues for a length of one joint of pipe (e.g. 60 or 90 feet). The drill bit is then lifted off bottom and mud flow is terminated while a new joint of pipe is assembled onto the drill string. The cycle is then repeated to complete a desired depth hole. Thus the bearing assembly is continually subjected to reversals between up-hole and down-hole thrust loading.

In addition to thrust loading, the bearing assembly also transmits substantial radial loads between the housing and shaft, particularly when the drilling assembly is turned to change the direction of the hole. Changing the direction of the hole is often referred to as deviation. During deviation, the shaft radially loads the bearing assembly by virtue of gravity (i.e., the weight of the shaft) and by bending forces on the shaft as deviation is made. Loading by bending can be reduced by shortening the drill assembly which typically can be more than 42 inches long for a six and one-half inch diameter assembly. Reduction of bending is important to reduce bending fatique on the shaft and radial loading upon the bearing assembly.

Previous bearing assemblies for down hole drill assemblies have required radial bearings at the upper and lower ends with intermediate thrust bearings to journal the shaft and transmit radial and thrust loads repsectively to the housing. For example, in Ioanesian, et al, U.S. Pat. No. 3,944,303, issued Mar. 16, 1976, a typical drilling assembly is shown. To accommodate the thrust loads, multiple sets of ball bearings are provided, each supported by a pair of inner and outer races secured respectively to the shaft and housing. Solid spacer rings separate the races from one another and fix the races against axial movement. A mechanical seal is also provided to prevent the drilling fluid from entering the ball bearings. To transmit radial loads from the shaft to the housing, radial supports are provided at each end of the housing.

To assure proper loading of the thrust bearings, close tolerances are required. Since the components are axially fixed, loose tolerances would result in uneven loading and wear on the bearings. Close manufacturing tolerances, in turn, increase the cost of the drilling assembly. Accordingly, there is a present need to provide a bearing assembly which does not require expensive, exacting tolerances to evenly distribute loads to the bearings.

Another problem, with prior drilling assemblies such as the type referred to above, is that the drilling assembly is relatively long. Long drilling assemblies increase the radial loads on the shaft during deviation which, in turn, requires more or larger radial bearings in addition to the thrust bearings. Accordingly, there is a need for a bearing assembly which accommodates both thrust and radial loads to shorten the overall length of the drilling assembly and to reduce the radial bending loads.

Yet another drawback of the type of drilling assembly set forth above is that the thrust ball bearings engage races having flat faces. This results in wear being concentrated in essentially a line around the races. Concentrated wear shortens the useful life of the bearings. There is, therefore, a need for thrust ball bearings which distribute wear to lengthen the life of its bearings.

Still another drawback of drilling assemblies of the type described above is that when the thrust bearing races are worn, they must be discarded and replaced. Frequent replacement requires a stock of replacement races to be maintained at the site. This results in a need for races which, when worn, can be reused rather than discarded.

SUMMARY OF THE INVENTION

There is, therefore, provided in the practice of this invention according to a presently preferred embodiment, a combined radial and thrust bearing assembly for a down hole motor having a stationary housing. Extending through the housing is a rotatable shaft mounting a drill bit at one end. Pairs of rotating inner races having toroidal outwardly facing, circumferential tracks are spaced along the length of and fixed the shaft and cooperate with pairs of stationary races in the housing having toroidal inwardly facing tracks to define a plurality of circumferential toroidal channels. Ball bearings are located in the channels to journal the shaft for rotation and transfer radial and thrust loads between the shaft and the stationary races. The tracks of the inner and outer races are interchangeable so that when they are worn, the races may be repositioned so that the new tracks define the toroidal channels.

To distribute the loads equally and transfer them to the housing and compensate for any manufacturing tolerance variations, the rotating races are crenelated for ease of assembly on the shaft. Similarly, the stationary outer races are crenelated for transmitting torque while permitting relative axial movement. Spring means are disposed between adjacent pairs of stationary races to bias the races to bear against the balls and to distribute radial and thrust loads equally between the races and balls. To lubricate and cool the bearing sets, a quantity of drilling fluid is passed through the housing and bearings.

BRIEF DESCRIPTION OF THE DRAWINGS

These and other features and advantages of the present invention will be appreciated as the same becomes better understood by reference to the following detailed description of the presently preferred embodiment when considered in connection with the accompanying drawings wherein:

FIG. 2 is a partial longitudinal section view of the lower portion of the bearing assembly; and FIGS. 3 and 4 are exploded views of a portion of the bearing assembly of FIGS. 1 and 2.

DETAILED DESCRIPTION

Figure 1:
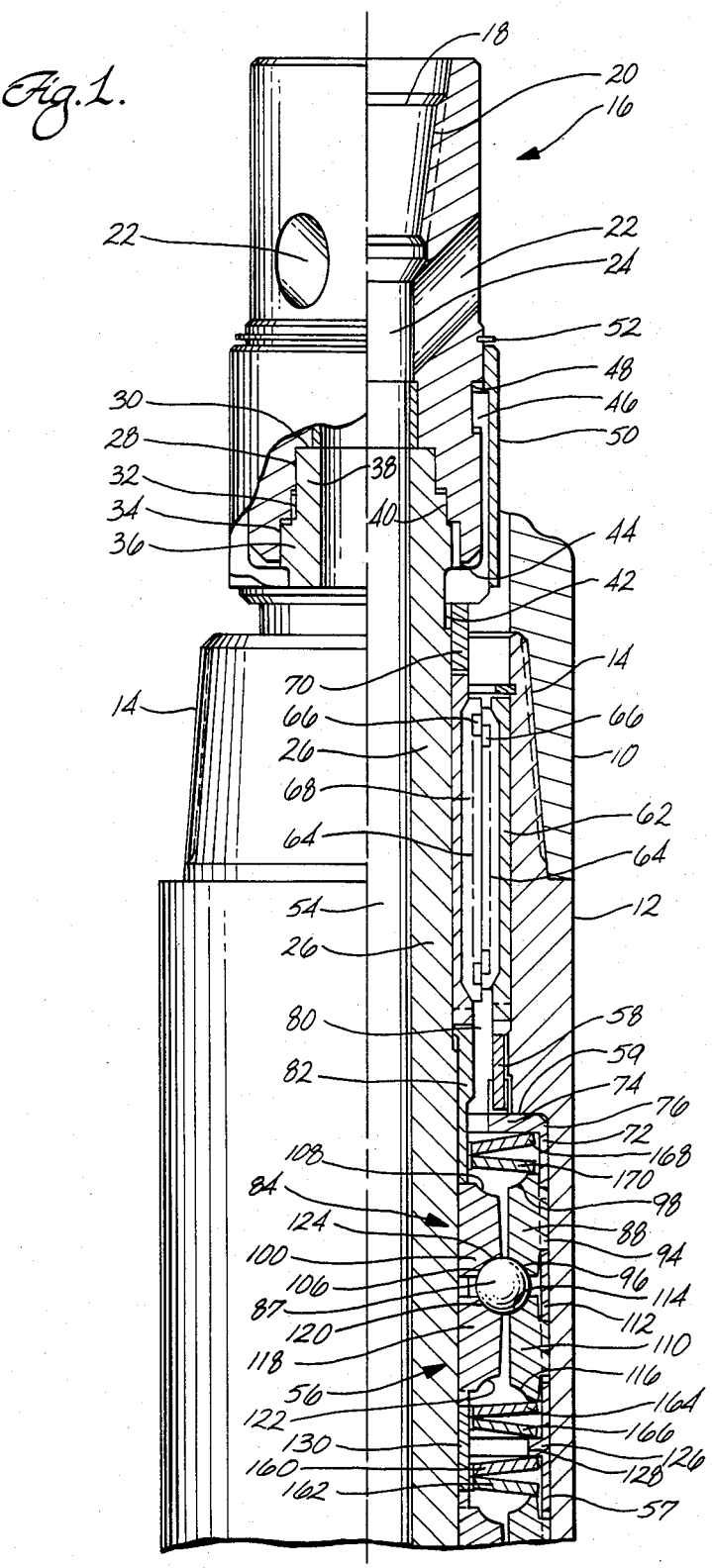
FIG. 1 is a partial longitudinal section view of the upper portion of the bearing assembly according to the present invention.

Turning to the drawings, a down hole assembly includes a sub 10, fixed to a down-hole motor casing (not shown) against rotation by a threaded connection or the like. The fluid motor may be either a multi-stage progressive-cavity positive-displacement type motor or a turbine. The drill motor disposed in the casing, as is well known, is used for driving a drill bit for drilling an oil well, or the like.

The sub 10 is connected to a housing 12 of the bearing assembly by cooperative threads 14. Accordingly, the housing 12, like the sub 10, is fixed to the drill string and does not rotate. Drilling fluid, hereinafter referred to as mud, is pumped down to the drill string to rotate the motor relative to the casing and the sub 10.

To transmit the rotation of the fluid motor to make a hole, the motor has a rotor (not shown) which is connected to a cap 16 located in and spaced from the sub 10. The rotor has a male threaded blind end which is received into a tapered cap bore 18 having cooperative threads 20. Accordingly, when mud is pumped down the drill string, the rotor and rotor cap 16 are caused to rotate. The mud discharged from the fluid motor passes through ports 22 leading to an axial supply bore 24 in the cap 16. As will be described in detail below, drilling mud flows through the supply bore 24 and eventually to the drill bit.

Opposite the rotor, the cap 16 is connected to a cylindrical drive shaft 26 disposed in the housing 12. In a well-known manner, the drive shaft 26 mounts a drill bit (not shown) in a threaded box 25 at its end opposite the rotor (FIG. 2). To interconnect the cap 16 and shaft 26, the cap 16 has a bore 28 coaxial to the supply bore 24 which terminates at an annular shoulder 30. Between the shoulder 30 and cap end is an eccentric counterbore 32 to couple the cap 16 to the shaft 26 for mutual rotation. A coaxial counterbore 34 extends from the eccentric counterbore 32 outward through the end of the cap 16 and has a diameter to closely receive the drive shaft 26.

To mate with the cap bore 18, the shaft 26 has a head 36 with an end 38 adapted to be closely received by the bore 28 and engage the shoulder 30. An eccentric collar surface 40 is disposed on the head 36 to be closely received by the eccentric counterbore 32 to couple the cap 16 and shaft 26 together for mutual rotation. Spaced from the collar surface 40 is a circumferential recess 42 defining a shoulder 44.

To prevent the shaft 26 from moving axially downward relative to the cap 16, a split ring 46 snaps over the cap 16 and is received into the recess 42 to abut the shoulder 44. The split ring 46 is also received into a cap recess 48. To hold the split ring 46 in place, a split ring retainer 50 fits over the split ring 46. A retaining snap ring 52 on the cap 16 prevents the split ring retainer 50 from moving axially.

As shown in FIGS. 1 and 2, the shaft 26 has an axial delivery bore 54 communicating with the supply bore 24 to deliver mud through the shaft 26 to the drill bit. During operation of the fluid motor, mud enters the ports 22 of the rotating cap 16 and through the supply bore 24 and the delivery bore 54 to cool the drill bit and remove rock fragments from the well hole often referred to a well bore or bore hole.

To journal the shaft 26 in the housing 12, a bearing assembly 56, as shown in FIGS. 1 and 2, is provided. The bearing assembly 56 is adapted to transmit all thrust loads and most of the radial loads between the shaft 26 and the housing 12. To accommodate the bearing assembly 56, the housing 12 has a circumferential cavity 57 which ends at an annular housing seat 59 at the upper end of the housing 12, the purposes of which will become evident.

The bearing assembly 56 includes a locking adapter 58, best shown in FIG. 3. The locking adapter is ring-shaped and is of a size to be spaced from the shaft 26 and to be closely received by the housing 12. The locking adapter 58 has, at one end, alternating grooves 58a and lands 58b and, at the other end, axially projecting fingers 60. The alternating grooves and lands 58a and 58b are adapted to interlock with cooperative grooves and lands (not shown) of a stationary upper radial bearing sleeve 62 as shown in FIG. 1. The stationary upper radial bearing sleeve 62 has an eccentric outer surface adapted to closely mate with and to be fixed to the housing 12 also made eccentric at its upper and to receive the upper radial bearing sleeve 62. The upper stationary bearing sleeve 62 mounts an insert matrix 64 having wear buttons 64 constructed of a wear-resistant material such as carbide or the like.

To cooperate with the upper stationary bearing sleeve 62 to transmit a part of the radial loads from the shaft 26 to the housing 12, and principally to serve as a means for restricting the flow of mud through the bearing assembly 56, there is an upper rotating bearing sleeve 68. The upper rotating bearing sleeve 68 is disposed to adjoin the upper stationary bearing sleeve 62 and is held in position by a spacer 70 engaging the split ring retainer 50. The upper rotating bearing sleeve 68 is constructed similar to the upper stationary bearing sleeve 62 having an insert matrix 64a and wear buttons 66a. The upper rotating bearing sleeve 68 may be fixed to the shaft 26 by, for example, an eccentric mounting. As can be appreciated, by viewing FIG. 1, a portion of the mud discharged from the fluid motor flows through the sub 10 and housing 12 to the narrow space between the upper rotating bearing sleeve 68 and the upper stationary bearing sleeve 62. The engaging bearing sleeves serve as a flow restriction to reduce the quantity and pressure of the mud admitted to the bearing asembly 56 while at the same time maintaining the pressure of the mud delivered through the ports 22.

Returning to FIG. 3, coupled to the locking adapter 58 is an upper locking ring 72. The upper locking ring 72 is generally cylindrical having alternating grooves 72a and lands 72b at one end and an annular wall 74 at the other end. The annular wall 74 defines a right-angle shoulder 76 which mates with the housing and seat 59 in the housing 12. Tangs 78, projecting axially from the angular wall 74 engage the fingers 60 of the locking adapter 58 and prevent the upper locking member 72 from rotating while permitting a degree of axial movement.

Spaced radially inwardly of the upper locking ring 72 to define a fluid passageway 80 therebetween is a spacer ring 82. The spacer ring 82 is cylindrical having at one end alternating grooves and lands 82a and 82b adapted to interlock with cooperative grooves and lands (not separately shown) of the upper rotating bearing sleeve 68 for mutual rotation with the shaft 26. At the other end, the spacer ring 82 has alternating grooves 82c and lands 82d to couple the spacer sleeve 82 to a first bearing set as set forth below.

To transmit thrust and radial loads from the shaft 26 in the housing 12, the bearing assembly 56 includes a first and second bearing sets 84 and 86 (FIGS. 1 and 2). Since the first and second sets 84 and 86 are identical, only the first bearing set 84 will be described in detail. The first and second bearing sets 84 and 86 are representative and three or four sets may be used as desired to carry a selected total of the thrust load.

The first bearing set 84 includes a number of balls 87 partially supported by a first stationary race 88 as shown in FIGS. 1 and 3. The first stationary race 88 is ring shaped having cylindrical, spaced inner and outer surfaces 90 and 92. Extending radially outwardly from the outer surface 92 are four rectangular locking tabs 94 adapted to be closely received against the wall of the housing cavity 57 to transmit radial loads thereto. The locking tabs 94 are spaced to be received into the grooves 72a of the upper locking ring 72 to interlock the first stationary race 88 and the upper locking ring 72 to prevent rotation. Extending between the inner and outer surfaces 90 and 92 are first and second toroidal tracks 96 and 98. The first stationary race 88 as with the other races and the balls hereinafter described may be made from or the tracks may be faced with a material having a hardness of at least 8 on the Mohs scale. Tungsten carbide has been found to be one such suitable material. As can be seen in FIG. 1, the tracks 96 and 98 are symmetrical about the central radial plane of the first stationary race 88 so that, for example, when track 96 becomes worn, the first stationary race 88, can be turned around so that the track 98 is positioned to bear against the balls 87.

Located radially inwardly of the first stationary race 88 about and rotating with the shaft 26 there is a first rotating race 100. The first rotating race 100 is ring shaped, having a cylindrical inner surface 102 adjacent the shaft 26, and a cylindrical outer surface 104. At each end of the first rotating race 100, there are alternating grooves and lands 100a and 100b adapted to interlock with the grooves and lands 82c and 82d of the spacer ring 82 to couple the first rotating race 100 to the spacer sleeve 82 for mutual rotation.

Similar to the first stationary race 88, the first rotating race 100 has a pair of first and second toroidal tracks 106 and 108 arranged symmetrically about the radial center plane of the first rotating race 100. Accordingly, for example, should track 106 become worn, the first rotating race 100 can be turned around such that track 108 bears against the balls 87.

The first bearing set 84 includes a second stationary race 110 which is identical to the first stationary race 88. The second stationary race 110 has first and second toroidal tracks 112 and 114 adapted to interchangeably bear upon the balls 87.

To couple the second stationary race 110 to the first stationary race 88, and to fix the second stationary race 110 against rotation, the first bearing set 84 includes a ball sleeve 116. The ball sleeve 116 is cylindrical and has an outer diameter to be received closely into the housing cavity 57. To interlock the first and second stationary races 88 and 110, the ball sleeve 116 includes grooves and lands 116a and 116b which are designed to interlock with the locking tabs 94 of the first and second stationary races 88 and 110. Accordingly, since the first stationary race 88 is fixed against rotation by the crenelations between the upper locking ring 72 and the locking tabs 94, the ball sleeve 116 interlocks and fixes the second stationary race 110 to the first stationary race 88 to prevent rotation relative to the housing 12.

To further support the balls 87 and transmit thrust and radial loads between the shaft 26 and housing 12, the first bearing set 84 includes a second rotating race 118. The second rotating race 118 is identical to the first rotating race 100 having alternating grooves 118a and lands 118b and first and second toroidal tracks 120 and 122. Again, as can be appreciated from the drawings, the tracks 120 and 122 are identical to interchangeably bear against the balls 87. To interlock the second rotating race 118 to the first rotating race 100 for mutual rotation with the shaft 26, the alternating grooves and lands 118a and 118b are interlocked with the cooperative grooves and lands 100a and 100b of the first rotating race 100.

As can be appreciated from the drawings and the above description, the tracks 96, 106, 114 and 122 cooperate to define a toroidal channel 124 extending circumferentially about the shaft 26 to house the balls 87. Rotation of the shaft 26 rotates the coupled first and second rotating races 100 and 118 which bear against and roll the balls 87 along the first and second stationary races 88 and 110.

To space the first and second bearing sets 84 and 86 from each other and transfer loads therebetween, the bearing assembly 56 includes a upper retainer sleeve 126. As can best be seen in FIGS. 1 and 3, the upper retainer sleeve 126 is cylindrical and is received closely by the housing cavity 57. To interlock the stationary races of the first and second bearing sets 84 and 86, the upper retainer sleeve 126 has alternating grooves 126a and lands 126b adapted to mate with the locking tabs 97. The upper retainer sleeve 126 also has a circumferential, radially inwardly projecting rib 128, the purposes of which will be described in detail below.

To further space the first and second bearing sets 84 and 86 and distribute loads therebetween, the bearing assembly 56 includes a rotating spacer sleeve 130. As seen in FIG. 3, the spacer sleeve 130 is cylindrical and is of a diameter to fit closely on the shaft 26. Each side of the spacer sleeve 130 has alternating grooves 130a and lands 130b adapted to interlock with the grooves and lands 118a and 188b of the rotating races of the adjacent bearing sets.

Turning to FIG. 2, at the lower end of the bearing assembly 56 a lower locking ring 132 is provided. The lower locking ring 132 is similar to the upper locking member 72, having an annular wall 134 defining a shoulder 136. To receive the shoulder 136 and transmit thrust to the first and second bearing sets 84 and 86, the shaft 26 has an annular boss 138 which creates a seat 140 to engage the shoulder 136 of the lower locking ring 132. The lower locking ring 132 has, at one end, alternating grooves and lands 132a and 132b adapted to interlock with the grooves and lands 118a and 118b of the second rotating race 118 of the lowermost bearing set. At the other end, the lower locking ring 132 has alternating grooves and lands 132c and 132d adapted to interlock with a lower rotating bearing sleeve 142 having a construction similar to the upper rotating bearing 68.

To couple the lower rotating bearing sleeve 142 to the shaft 26 to mutual rotation, the boss 138 and lower rotating bearing 148 are made somewhat eccentric. Accordingly, rotation of the shaft 26 rotates the rotating bearing sleeve 142, lower locking ring 132 and the remaining rotating components of the bearing assembly 56 including the rotating races of the first and second bearing sets 84 and 86.

The assembly of the lower locking ring 132, lower rotating bearing sleeve 14, first and second bearing set inner races, spacer sleeve 130, spacer ring 82, upper rotating bearing sleeve 68, spacer 70 and split ring 46 are assembled on the shaft 26 and locked in place to rotate with the shaft. To do so, the shaft has axial tension applied before the split ring is put in place. The length of the spacer 70 is selected so that the assembly on the shaft is tightly engaged between the seat 140 and the shoulder 44 when tension on the shaft is released. This keeps the elements on the shaft in tight abutment.

A lower retainer sleeve 144 is crenelated with the second stationary race of the second bearing set 86. The lower retainer sleeve 144 is similar to the upper upper retainer sleeve 126 in that it has alternating grooves 144a and lands 144b at each end adapted to interlock with the locking tabs 94 of the second bearing set 86 and with a lower stationary bearing sleeve 146. An annular, inwardly projecting rib 145 is disposed on the lower retainer sleeve 144 for purposes which will hereinafter become evident.

The lower stationary bearing sleeve 146 is similar to the upper stationary bearing 62, the lower stationary bearing 146 being closely received by the housing 12 and having an eccentric tab 148 received by the housing 12 to prevent rotation.

To lock the components of the outer portion of the bearing assembly 56 within the housing 12, a lock nut 150 is threaded to the lower end of the housing 12. A lock ring 152 and split retaining ring 154 secure the lock nut 150 to the housing 12. Further details of the locking assembly are set forth in my U.S. patent application, Ser. No. 365,633 entitled "Lock Nut Assembly" which is hereby incorporated by reference.

In operation, when the drilling assembly is making a hole at the on-bottom condition, the pipe string, sub 10, and housing 12 are downwardly loaded to force the drill bit against the rock formation. As a result of the downward loading of the pipe string, the shaft 26 witnesses an upward thrust load and during deviation, a radial loading. The upward thrust loading on the shaft 26 is transferred from the shaft seat 140 to the shoulder 136 of the lower locking ring 132. The loading on the lower locking ring 132 is transferred to the spacer sleeve 130 and to the second bearing set 86 and more particularly to the lower or second rotating race 118. The second rotating race 118 transfers a portion of the thrust loading to the balls 87 which journal the shaft 26 for rotation. At the second bearing set 86, the thrust load is broken into axial and radial components. The axial component is transmitted to both the second bearing first rotating race 100 and the first stationary race 88 whereas the radial component is transferred to both the first and second stationary races 88 and 110. A portion of any radial loads on the shaft 26 are transferred from the shaft 26 to the lower bearing first and second stationary races 88 and 110 through the first and second rotating races 110 and 118 and balls 87. The second stationary race 110 is maintained in engagement with the balls 87 for receiving radial loads by a pair of belleville springs 156 and 158, one of which bears against the rib 145 of the lower retainer sleeve 144, the other belleville spring 158 bearing against the second stationary race 110.

The radial component of the thrust and the radial loads on the shaft are transmitted through the balls 87 to the first and second stationary race 88 and 110 and through the locking tabs 94 to the housing 12. The axial component is transferred to a second pair of belleville springs 160 and 162. Belleville springs 160 and 162 transmit the axial load from the first stationary race 88 of the second bearing set 88 to the rib 128 of the upper retainer sleeve 126. The ends of the upper lands 126b on the upper retainer sleeve 126 bear against the ends of the lower lands 116b on the next or first bearing set 84 upwardly in the assembly for transmitting axial loads upwardly, eventually to be borne at the end seat 59.

The thrust load upon the first rotating race 100, which is less than the initial thrust loading due to the thrust being loaded upon the first stationary race 88, is transferred through the spacer sleeve 130 to the second rotating race 118 of the first bearing set 84.

In the upper or first bearing set 84, the loading of the second rotating race 118 is transferred to the balls 87, which in turn, distribute the thrust components of the load to the first stationary race 88 and the first rotating race 100. The radial component of the thrust loading upon the first stationary race 88 and the radial loads on the shaft are transferred through the first and second stationary races 88 and 110 to the housing 12 while the axial component is transmitted to another set of belleville springs 168 and 170. These belleville springs 168 and 170, housed between the first bearing set 84 and the annular wall 74 of the upper locking ring 72, transmit the thrust load to the upper locking ring 72 and through its shoulder 76 to the seat 59 and to the housing 12.

The belleville springs 160, 162, 168 and 170 between the upper stationary races 88 and the rib 128 or annular wall 74 provide a means to evenly distribute the thrust loading between the first and second bearing sets 84 and 86. The tabs 94 on the stationary bearing races do not engage the bottoms of the grooves 116a or 126a in the spacers. Thus, thrust is transmitted from such a stationary race to the respective sleeve only by way of the belleville springs. The deflection of each set of belleville springs distributes the thrust load since the deflection permits shifting of the shaft 26 and application of a portion of the thrust on the other bearing set. Thus during on-bottom loading, the belleville springs will axially position the bearing sets 84 and 86 so that each belleville spring is equally deflected. This in turn distributes the loads between the first and second bearing sets 84 and 86 to ensure even wear. Furthermore, the belleville springs will takeup any manufacturing tolerance variations of the components enabling the bearing assembly 56 to be manufactured to less strict dimensions thereby lessening cost.

When the drill string and drilling assembly are lifted from the bottom of the hole while drilling mud is being pumped, the shaft 26 is subjected to a downward thrust. The transmission of the aforementioned downward thrust to the housing 12 is essentially the reverse of that described above. The downward thrust is loaded upon the first bearing set 84, the radial component of which and radial loads on the shaft are transferred to the housing 12. The thrust load is transferred through the belleville springs 164 and 166, to the retainer sleeve 126. At the second bearing set 86, the radial component of the thrust and the radial loads are transmitted to the housing 12 while the axial component of thrust is transmitted through the belleville springs 156 and 158 to the lower retainer sleeve 144, and lower stationary bearing sleeve 146 and finally to the locknut 150 and housing 12. The compliant belleville springs distribute the off-bottom thrust loads between the bearing sets in the same manner as hereinabove described. As can be appreciated, by virtue of the multiple sets of belleville springs, the bearing assembly 56 is self-adjusting to evenly distribute the thrust loads between the first and second bearing sets 84 and 86 in both on-bottom and off-bottom modes.

As stated above, during deviation, the first and second bearing sets 84 and 86 transmit, not only thrust loads and radial components thereof but also, radial loads to the housing 12. The compliant belleville springs distribute the off-bottom thrust loads between the bearing sets in the same manner as hereinabove described. While the upper and lower stationary and rotating bearings 62, 68, 142 and 146 carry a portion of the load, a major portion of the radial forces are transmitted through the balls 87 and eventually to the the housing 12. Accordingly, since separate radial bearings are not required to transmit the entire radial force to the housing 12, the bearing assembly 56 and the housing 12 may be shorter than counterparts heretofore found in the prior art. This, in turn, reduces the bending of the assembly and the resulting radial loads produced at deviation.

To lubricate and cool the first and second bearing sets 84 and 86, drilling mud is passed through the narrow space between upper stationary bearing sleeve 62 and upper rotating bearing sleeve 68 into the passageway 80. The engaging upper stationary and rotating bearings sleeves 62 and 68 restrict or throttle the flow of mud to the desired rate. Flowing through the passageway 80 around the belleville springs, the mud flows through the first and second bearing sets 84 and 86 for cooling and lubrication. At the bottom of the bearing assembly 56 the mud is discharged through the space between the lower rotating bearing sleeve 142 and lower stationary bearing sleeve 146 through a discharge port 172. The space between the lower stationary and rotating bearing sleeves 146 and 142 restricts mud flow to the desired rate to keep the cavity 57 filled with mud. By cooling and lubricating the bearing sets, the life of the bearings may be increased. Collectively, the radial bearing sleeves limit the flow of mud through the assembly to a sufficient amount to keep the bearings cool and still maintain sufficient mud pressure above the bearings to provide flow through the passage 59 to the drill bit.

For purposes of the discussion to follow, the components of the first bearing set 84 will be referred to, however, it is to be understood that the following description applies equally to the second bearing set 86. When the tracks 96, 106, 114 and 122 of the races of the first and second bearing sets 84 and 86 and the balls 87 have become worn, the housing 12 and sub 10 are separated and the locknut 152 and split ring 46 are removed. The bearing assembly 56 is then disassembled and reassembled with the first and second rotating races 100 and 118 and first and second stationary races 88 and 110 repositioned such that tracks 98, 108, 112 and 120 now bear against a new set of balls 87. Accordingly, it is to be appreciated that the bearing races, by having interchangeable pairs of tracks, have twice the useful life than races heretofore found in the prior art which have only one track and which must be discarded after that track is worn. This, in turn, dispenses with the need to keep a large inventory of races and enables the drilling assembly to return quickly and inexpensively to service. If desired, the eraces and the balls can be formed of highly wear resistant material such as tungsten carbide, silicon carbide or aluminum oxide. This is particularly significant when the bearings are run in abrasive drilling mud.

While a certain preferred embodiment of the present invention has been shown and described, it is to be understood that it is subject to many modifications and variations without departing from the scope of the claims hereinafter set forth. For example, if desired—instead of having toroidal tracks on the races for engagement by the balls, conical races can be used to transmit both radial and thrust loads. In some embodiments the crenelations at the ends of the ring-shaped races can have sides angled relative to the length of the assembly instead of extending longitudinally as in the illustrated embodiment.

What is claimed is:
1. A combined radial and thrust bearing assembly comprising:
   a fixed housing;
   a rotatable shaft extending through the housing;
   a plurality of inner race tracks fixed on the shaft, each pair of adjacent inner race tracks defining an inner portion of the channel;
   a plurality of outer race tracks mounted in the housing including means for preventing rotation and means for permitting limited axial movement within the the housing, each pair of outer races having a pair of adjacent tracks defining an outer portion of the channel;

a plurality of bearing balls in the channel formed by the inner and outer tracks, said tracks being shaped for transmitting radial and thrust loads via the bearing balls;

upper spring means between an upper pair of outer races and the housing for transmitting an upwardly directed thrust load from the upper pair of outer races to the housing;

a shoulder fixed inside the housing between adjacent pairs of outer races; and lower spring means between a lower pair of outer races and the shoulder for transmitting an upwardly directed thrust load from the lower pair of outer races to the shoulder and the housing, the upper and lower springs means being substantially equal for distributing the upwardly directed thrust loads substantially equally between the upper and lower pairs of outer races.

2. The combined radial and thrust bearing assembly of claim 1 wherein the inner race tracks and the outer race tracks are conical to define a polygonal, circumferentially extending channel.

3. The combined radial and thrust bearing assembly of claim 1 wherein the inner race tracks and outer race tracks are toroidal to define a toroidal channel.

4. The combined radial and thrust bearing assembly of claim 1 wherein the means for permitting limited axial movement of the outer races within the housing includes crenelations between and coupling the outer races.

5. The combined radial and thrust bearing assembly of claim 1 further including a ring disposed in the housing between the upper and lower spring means, the ring including a rib engaged by the upper and lower spring means for distribution of thrust loads between the upper and lower pairs of outer races.

6. The combined radial and thrust bearing assembly of claim 1 further including second lower spring means disposed between the lower pair of outer races and the housing for transmitting a downwardly directed thrust load from the lower pair of outer races to the housing, the second lower and lower spring means being substantially equal for distributing the downwardly directed thrust loads substantially equally between the upper and lower pairs of outer races.

7. A combined radial and thrust bearing assembly for a downhole drilling assembly comprising:
a fixed housing;
a rotatable shaft extending through the housing;
an upper pair of inner races fixed on the shaft and collectively forming a portion of an upper ball channel;
at least one lower pair of inner races fixed on the shaft and collectively forming an outwardly facing portion of a lower ball channel;
an upper pair of outer races mounted in the housing and collectively forming an inwardly facing portion of the upper ball channel;
at least one lower pair of outer races mounted in the housing and collectively forming an inwardly facing portion of the lower ball channel;
a plurality of bearing balls in the upper ball channel;
a plurality of bearing balls in the lower ball channel;
means for preventing rotation of the outer races relative to the housing;
a pair of belleville springs between the upper outer races and the housing for transmitting an upwardly directed thrust from the upper outer races to the housing;
a pair of belleville springs between the lower outer races and the housing for transmitting a downwardly directed thrust from the lower outer races to the housing; and
spring means disposed between the upper and lower outer races, the spring means in cooperation with the belleville springs distributing thrust loads substantially equally between the upper and lower pairs of outer races.

8. The combined radial and thrust bearing assembly of claim 7 wherein the spring means includes at least one belleville spring.

9. The combined radial and thrust bearing assembly of claim 7 wherein the spring means includes several cooperative pairs of belleville springs.

10. The combined radial and thrust bearing assembly of claim 9 further including a shoulder disposed within the housing between two of the several cooperative pairs of belleville springs.

11. A combined radial and thrust bearing assembly for a down-hole drilling assembly comprising: a fixed housing;
a rotatable shaft extending through the housing;
upper and lower pairs of inner tracks fixed to the shaft, each pair of inner tracks defining an outwardly facing portion of a channel adapted to support a plurality of bearing balls;
at least one upper outer bearing race in the housing having a diagonally extending track engaging the bearing balls in the upper channel and having an axially compliant connection to the housing for transmitting a first thrust load to the housing;
at least one lower outer bearing race in the housing having a diagonally extending track engaging the bearing balls in the lower channel and having a compliant connection to the housing for transmitting a second thrust load substantially equal to the first thrust load.

12. A ring-shaped race for a combined radial and thrust bearing assembly comprising:
a plurality of upper lands and grooves forming crenelations on an upper end of the ring;
a plurality of lower lands and grooves forming crenelations on the lower end of the ring, the upper and lower crenelations being substantially the same;
an annular upper ball track between the upper crenelations and the middle of the ring and having a diagonally extending face; and
an annular lower ball track between the lower crenelations and the middle of the ring and having a diagonally extending face, the upper and lower ball tracks being substantially the same.

13. A race as recited in claim 12 wherein the ball tracks each comprise an inwardly facing conical surface and the crenelations are at a greater radial distance from the center of the ring than the tracks.

14. A race as recited in claim 12 wherein the ball tracks each comprise an inwardly facing toroidal surface and the crenelations are at a greater radial distance from the center of the ring than the ball tracks.

15. A face as recited in claim 12 wherein the lands and grooves are each substantially equal in circumferential extent and axial length.

16. A race as recited in claim 12 wherein at least the ball tracks of each race have a hardness of at least 8 on the Mohs scale.

17. The race as recited in claim 16 wherein the tracks are fashioned from tungsten carbide.

* * * * *

UNITED STATES PATENT AND TRADEMARK OFFICE
CERTIFICATE OF CORRECTION

PATENT NO. : 4,511,193
DATED : 16 APRIL 1985
INVENTOR(S) : BELA A. GECZY

It is certified that error appears in the above-identified patent and that said Letters Patent is hereby corrected as shown below:

Column 1, line 5, "down hole" should be -- down-hole --.

Column 1, line 11, "down hole" should be -- down-hole --.

Column 2, line 16, "fatique" should read -- fatigue --.

Column 2, line 18, "down hole" should be -- down-hole --.

Column 3, line 6, "down hole" should be -- down-hole --.

Column 3, line 49, "down hole" should be -- down-hole --.

Column 4, line 44, after "to" insert -- as --.

Column 7, line 3, "a" should read -- an --.

Column 7, line 20, "188b" should read -- 118b.

Column 7, line 59, change "upper upper" to -- upper --.

UNITED STATES PATENT AND TRADEMARK OFFICE
CERTIFICATE OF CORRECTION

PATENT NO. : 4,511,193

DATED : 16 APRIL 1985

INVENTOR(S) : BELA A. GECZY

It is certified that error appears in the above-identified patent and that said Letters Patent is hereby corrected as shown below:

Column 8, lines 7-8, "lock nut" should read -- locknut --.

Column 10, line 41, "eraces" should read -- races --.

Column 11, line 1, change "the the" to -- the --.

Column 11, line 18, "springs" should read -- spring --.

Column 11, line 49, "downhole" should read -- down-hole --.

Column 12, line 60, "face" should read -- race --.

Signed and Sealed this

Thirteenth Day of August 1985

[SEAL]

Attest:

DONALD J. QUIGG

Attesting Officer     Acting Commissioner of Patents and Trademarks